United States Patent [19]

Isobe et al.

[11] Patent Number: 4,726,964

[45] Date of Patent: Feb. 23, 1988

[54] METHOD FOR IMPARTING RELEASABILITY TO A SUBSTRATE SURFACE

[75] Inventors: Kenichi Isobe; Hisashi Aoki; Yasuaki Hara; Meguru Kashida; Kiyohiro Kondow, all of Gunma, Japan

[73] Assignee: Shin-Etsu Chemical Co., Ltd., Tokyo, Japan

[21] Appl. No.: 848,814

[22] Filed: Apr. 4, 1986

[30] Foreign Application Priority Data

Apr. 10, 1985 [JP] Japan .................................. 60-75585

[51] Int. Cl.$^4$ ............................................. B05D 3/06
[52] U.S. Cl. .................................... 427/54.1; 427/387
[58] Field of Search ...................... 427/54.1, 387, 391, 427/393.5

[56] References Cited

U.S. PATENT DOCUMENTS

| | | | |
|---|---|---|---|
| 4,559,396 | 12/1985 | Sasaki et al. | 427/387 X |
| 4,585,705 | 4/1986 | Broderick et al. | 427/387 X |
| 4,600,484 | 7/1986 | Drahnak | 427/54.1 X |
| 4,603,086 | 7/1986 | Fujii | 427/387 X |

*Primary Examiner*—Thurman K. Page
*Attorney, Agent, or Firm*—Jules E. Goldberg

[57] ABSTRACT

The invention provides a method for imparting releasability to the surface of a plastic film or paper by coating the surface with an organopolysiloxane composition followed by curing, in which the curing is complete by heating at a relatively low temperature and the cured surface film of the composition is very stable and free from the problem of transfer to another body in contact therewith. The composition comprises a vinyl-containing organopolysiloxane, an organohydrogenpolysiloxane and a platinum compound to catalyze the addition reaction between the silicon-bonded vinyl groups and silicon-bonded hydrogen atoms. Different from conventional organohydrogenpolysiloxane having a linear molecular structure, the organohydrogenpolysiloxane used in the invention is represented by the general unit formula $(RSiO_{1.5})_m(RHSiO_{0.5})_n$, in which R is a monovalent hydrocarbon group free form unsaturation and m and n are each a positive integer with the proviso that the ratio of n/m is from 0.1 to 3.0, or a combination thereof with a linear organohydrogenpolysiloxane.

10 Claims, No Drawings

METHOD FOR IMPARTING RELEASABILITY TO A SUBSTRATE SURFACE

BACKGROUND OF THE INVENTION

The present invention relates to a method for imparting releasability to the surface of a substrate such as a plastic film or paper by use of a curable organopolysiloxane composition or, more preferably, to a method for the preparation of a release paper having a surface film of a cured organopolysiloxane composition, of which the curing reaction of the composition can be completed at a relatively low temperature and the surface film of the cured organopolysiloxane composition is stable over a length of time and free from the problem of transfer to the adhesive surface to which the release paper is applied and bonded.

As is well known, the surfaces of sticky materials such as pressure-sensitive adhesive tapes coated with a sticking adhesive are temporarily protected from inadvertent sticking by applying and bonding a release paper thereto, which is a paper provided with a surface film having releasability by coating with a releasing composition. Among various types of releasing compositions, the most widely used ones are the oreganopolysiloxane-based compositions comprising an organopolysiloxane having two or more of aliphatically unsaturated hydrocarbon groups bonded to the silicon atoms in a molecule, an organohydrogenpolysiloxane having hydrogen atoms directly bonded to the silicon atoms and a platinum catalyst with optional admixture of a stabilizer and solvent, in which the crosslinking reaction proceeds by the addition reaction between the silicon-bonded unsaturated hydrocarbon groups and the silicon-bonded hydrogen atoms.

The organohydrogenpolysiloxane conventionally used in the above mentioned surface-releasing organopolysiloxane composition of the addition reaction type is a methylhydrogenpolysiloxane having a substantially linear molecular structure and represented by the general formula

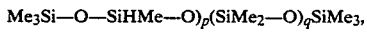

Me$_3$Si—O—SiHMe—O)$_p$(SiMe$_2$—O)$_q$SiMe$_3$, in which the Me denotes a methyl group and the subscripts p and q are each a positive integer. Of the two types of the siloxane units, i.e. methylhydrogensiloxane units and dimethylsiloxane units, in the methylhydrogenpolysiloxane, the dimethylsiloxane units form only a minor portion of the overall siloxane units. Accordingly, a considerably large number of the silicon-bonded hydrogen atoms remain unreacted even when the curing reaction of the composition has been seemingly complete and the residual silicon-bonded hydrogen atoms pertain to the reaction with the silicon-bonded unsaturated hydrocarbon groups in the lapse of time to gradually increase the density of crosslinks so that the releasability of the release paper is subject to change in time. When curing of the organopolysiloxane composition is performed by heating at a relatively low temperature or by ultraviolet irradiation for a short time, a small portion of the organopolysiloxane remains uncrosslinked and may be sometimes transferred to the sticking adhesive surface or to the back surface of paper in a roll or stack so as to cause decrease in the stickiness of the sticking adhesive or repellency of inks and paints on the surface.

Since it is a usual formulation of the organopolysiloxane-based releasing composition in order to achieve full curing that the organohydrogenpolysiloxane is used in such an excess amount that the silicon-bonded hydrogen atoms are provided in an amount of 1.5 moles or larger per mole of the silicon-bonded unsaturated hydrocarbon groups in the organopolysiloxane, it is naturally unavoidable that a large number of the silicon-bonded hydrogen atoms are left unreacted even when the addition reaction with the silicon-bonded unsaturated groups has proceeded to an extent of very completion. Such a residual amount of the silicon-bonded hydrogen atoms is of course responsible for the changes in time caused in the interface with the adhesive surface so that the peeling resistance of the release paper from the adhesive surface is gradually increased in the lapse of time.

Various attempts and proposals have been made hitherto to improve the organopolysiloxane-based releasing composition in this regard but the improvements hitherto undertaken are mainly in connection with the platinum catalyst, by which no fundamental solution of the above mentioned problems has yet been obtained although the curing velocity of the composition can seemingly be increased.

SUMMARY OF THE INVENTION

Thus, the method of the present invention to impart releasability to the surface of a substrate, which has been established as a result of the investigations undertaken with an object to solve the above mentioned problems in the prior art, comprises the steps of:

(a) coating the surface of a plastic film or paper with an organopolysiloxane composition comprising
  (1) an organopolysiloxane having, in a molecule, at least two aliphatically unsaturated hydrocarbon groups bonded to the silicon atoms,
  (2) an organohydrogenpolysiloxane represented by the general unit formula

$$(RSiO_{1.5})_m(R_2HSiO_{0.5})_n, \qquad (I)$$

in which each R is, independently from the others, a substituted or unsubstituted monovalent hydrocarbon group free from aliphatic unsaturation and the subscripts m and n are each a positive integer with the proviso that the ratio of n/m is larger than 0.1 but smaller than 3, in such an amount that from 0.5 to 5 moles of the hydrogen atoms directly bonded to the silicon atoms are provided per mole of the aliphatically unsaturated hydrocarbon groups in the organopolysiloxane as the component (1), and
  (3) a catalytic amount of a platinum compound; and (b) heating the plastic film or paper coated with the organopolysiloxane composition or irradiating the same with ultraviolet light to cure the organopolysiloxane composition.

DETAILED DESCRIPTION OF THE PREFERRED EMBODIMENTS

As is understood from the above given summarizing description, the method of the invention characteristically employs a specific organopolysiloxane composition curable by heating or irradiating with ultraviolet light. The organopolysiloxane composition essentially comprises three components (1), (2) and (3), of which the component (2) is the most characteristic and represented by the general unit formula (I) given above. As a result of the use of this unique component, the composition can be cured completely even by heating at a relatively low temperature or by irradiating with a relatively small dose of ultraviolet light owing to the higher reactivity of the silicon-bonded hydrogen atoms than in conventional organohydrogenpolysiloxanes. The surface film of the cured organopolysiloxane composition according to the invention is free from the problem of transfer to the adhesive surface in contact therewith and stable in the lapse of time. The organopolysiloxane composition used in the invention is prepared without formulating an excess amount of the organohydrogenpolysiloxane so that the cured surface film of the composition is free from the phenomenon of increasing peeling resistance in the lapse of time due to the residual silicon-bonded hydrogen atoms.

The component (1) in the organopolysiloxane composition used in the inventive method is an organopolysiloxane having, in a molecule, at least two aliphatically unsaturated hydrocarbon groups. Such an organopolysiloxane is well known in the art. The aliphatically unsaturated hydrocarbon group is not particularly limitative to a specific type provided that it is capable of pertaining to the hydrosilation reaction with the silicon-bonded hydrogen atom in the organohydrogenpolysiloxane as the component (2) including vinyl, allyl and ethynyl groups, of which vinyl group is preferred. The other organic groups bonded to the silicon atoms other than the above mentioned unsaturated hydrocarbon groups are each a monovalent hydrocarbon group exemplified by alkyl groups, e.g. methyl, ethyl, propyl and butyl groups, aryl groups, e.g. phenyl and naphthyl groups, alkaryl groups, e.g. tolyl and xylyl groups, and cycloalkyl groups, e.g. cyclohexyl group, as well as those substituted groups obtained by replacing a part or all of the hydrogen atoms in the above named hydrocarbon groups with substituents such as halogen atoms, cyano groups and the like as exemplified by chloromethyl, chloropropyl, trifuluoropropyl and cyanomethyl groups. It is preferable that substantially all of the organic groups other than the unsaturated hydrocarbon groups are methyl groups.

The molecular configuration of the organopolysiloxane as the component (1) is not particularly limitative including straightly linear chain-like, branched chain-like and network-like ones but the organopolysiloxane is preferably a vinyl methyl polysiloxane having a linear molecular structure terminated at both molecular chain ends each with a dimethyl vinyl silyl group and expressed by the structural formula,

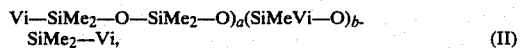
$$\text{Vi}-\text{SiMe}_2-\text{O}-\text{SiMe}_2-\text{O})_a(\text{SiMeVi}-\text{O})_b\text{-SiMe}_2-\text{Vi}, \qquad (II)$$

in which Me and Vi denote methyl and vinyl groups, respectively, and the subscripts a and b are each a positive integer.

It is preferable that from 0.2 to 5.0% by moles of the organic groups bonded to the silicon atoms in the organopolysiloxane are the aliphatically unsaturated hydrocarbon groups, e.g. vinyl groups, though dependent on the particularly intended application of the release paper prepared according to the inventive method. The organopolysiloxane is not particularly limitative in respect of the molecular weight but preferably has at least 50 silicon atoms in a molecule or a viscosity of at least 100 centistokes at 25° C.

The component (2) comprised in the organopolysiloxane composition used in the inventive method is an organohydrogenpolysiloxane represented by the above given general unit formula (I), in which each R is a substituted or unsubstituted monovalent hydrocarbon group exemplified by those given above as the examples of the organic groups other than the unsaturated hydrocarbon groups in the organopolysiloxane as the component (1). Although each of the groups denoted by R can be selected independently from the others, it is preferable that substantially all of the groups denoted by R are methyl groups. The subscripts m and n in the formula are each a positive integer with the proviso that the ratio n/m is larger than 0.1 but smaller than 3.0 or, preferably, larger than 0.2 but smaller than 1.5. The amount of the silicon-bonded hydrogen atoms can be determined by the volume of the hydrogen gas when the organohydrogenpolysiloxane is decomposed with an alkali. The volume of the hydrogen gas should preferably be in the range from 80 to 200 ml at N.T.P. per g of the siloxane. The organohydrogenpolysiloxane as the component (2) should preferably have a viscosity in the range from 5 to 100 centistokes at 25° C.

The organohydrogenpolysiloxane above described can be prepared, for example, by the cohydrolysis-cocondensation reaction of a mixture composed of an monohydrocarbyl trichlorosilane of the formula RSiCl$_3$ and a dihydrocarbyl chlorosilane of the formula R$_2$HSiCl in a molar ratio of m:n in a solvent mixture of water and an alcohol. More preferably, the organohydrogenpolysiloxane can be prepared by the cohydrolysis-cocondensation reaction of a mixture of a partially hydrolyzed and condensed hydrocarbyl alkoxy silane and a 1,1,3,3-tetrahydrocarbyl disiloxane in an alcoholic solution of hydrochloric acid.

In the formulation of the organopolysiloxane composition used in the inventive method, it is preferable in order to increase the adhesive bonding strength of the cured surface film of the composition to the plastic film or paper as the substrate that a part of the organohydrogenpolysiloxane represented by the above given general unit formula (I) is replaced with another organohydrogenpolysiloxane having a linear molecular structure and represented by the general formula

$$R^1-\text{SiR}_2-\text{O}-\text{SiHR}-\text{O})_p(\text{SiR}_2-\text{O})_q\text{SiR}_2R^1, \qquad (III)$$

in which R has the same meaning as defined above, R$^1$ has the same meaning as R or is a hydrogen atom, the subscript p is a positive integer of 1 to 1000 and the subscript q is zero or a positive integer not exceeding 1000. The combined use of this linear organohydrogenpolysiloxane with the first organohydrogenpolysiloxane of the general unit formula (I) is effective to prevent falling of the cured surface film of the composition from the substrate surface without adverse influences of decreased reactivity and corrosiveness to metals as are unavoidable in conventional formulations for falling prevention. As to the mixing ratio of the first and the second organohydrogenpolysiloxanes of the formulas (I) and (III), it is preferable that from one tenth to nine tenths or, more preferably, from one fourth to three fourths of the overall amount of the silicon-bonded hydrogen atoms is provided by the second organohydrogenpolysiloxane.

The organohydrogenpolysiloxane as the component (2) should be comprised in the organopolysiloxane composition used in the inventive method in such an amount that from 0.5 to 5.0 moles or, preferably, from 1.0 to 1.5 moles of the silicon-bonded hydrogen atoms are provided per mole of the aliphatically unsaturated hydrocarbon groups in the organopolysiloxane as the component (1). When the amount of the component (2) is smaller than the lower limit of the above mentioned range, the cured surface film of the composition cannot be free from the problem of transfer of the silicone constituent from the cured surface film to the adhesive surface in contact therewith. When the amount of the organohydrogenpolysiloxane is too large, on the other hand, the silicon-bonded hydrogen atoms remain unreacted in an unnegligibly large amount so that various undesirable effects are caused by the residual silicon-bonded hydrogen atoms.

The component (3) comprised in the organopolysiloxane composition used in the inventive method is a platinum compound which serves as a catalyst to accelerate the addition reaction between the silicon-bonded aliphatically unsaturated hydrocarbon groups in the component (1) and the silicon-bonded hydrogen atoms in the component (2). The platinum compound may be any of known ones conventionally used in such a purpose including chloroplatinic acid, an alcohol solution of chloroplatinic acid, a complex of chloroplatinic acid with an olefin, aldehyde, vinylsiloxane and the like. Solid platinum catalysts such as platinum black and those supported on a carrier, e.g. silica, alumina and the like, can also be used. The amount of the platinum compound in the organopolysiloxane composition is a so-called catalytic amount and not particularly limitative depending on the desired curing velocity of the composition. It is, however, used in an amount in the range from 0.001 to 0.1% by weight as platinum based on the total amount of the components (1) and (2) in most cases.

The curable organopolysiloxane composition used in the inventive method can be prepared by uniformly blending the above described essential components (1), (2) and (3). It is optional that, when extension of the pot life of the composition or suppression of the catalytic activity of the platinum compound at room temperature is desired, the composition is admixed with various compounds having an activity as a retarder or moderator of the catalytic activity such as nitrogen-containing organic compounds, organophosphorus compounds, acetylenic compounds and the like. Further, the composition may be admixed with various kinds of optional additives according to need including aminopropyl triethoxy silane, vinyl triacetoxy silane and the like as an adhesion improver to prevent falling of the cured surface film of the composition from the substrate and a finely divided silica powder to obtain a mat surface.

The substrate material coated with the above described organopolysiloxane composition in the inventive method can be a plastic film or paper such as kraft paper, glassine paper, polyethylene-laminated paper and the like. In the coating process with the composition, if necessary, the coating composition may be diluted with an organic solvent such as toluene, xylene, trichloroethylene, hexane, ethyl acetate, methyl ethyl ketone and the like or may be emulsified in an aqueous medium by the aid of an emulsifying agent. The organic solution or aqueous emulsion of the composition is evenly applied to the substrate surface by use of a suitable known coating machine such as roll coaters, gravure coaters, air coaters, bar coaters and the like. The thus coated substrate surface after drying is then heated for 10 seconds or longer at a temperature of 80° C. or higher or, preferably, 100° C. or higher or is irradiated with ultraviolet light to cure the organopolysiloxane composition so that the composition is converted into a cured surface film having releasability.

In the following, the method of the invention is illustrated in more detail by way of examples preceded by the description of the procedures for the preparation of the organohydrogenpolysiloxane as the component (2) comprised in the organopolysiloxane composition used in the inventive method. In the description below, the expression of "parts" always refers to "parts by weight" and the values of viscosity are all those obtained by the measurement at 25° C. The release papers prepared in the Examples were evaluated in three respects of peeling resistance, retention of adhesiveness and transfer of silicone according to the procedures described below.

Peeling resistance

The plastic film or paper as the substrate was coated with the organopolysiloxane composition which was then subjected to curing followed by standing at 25° C. for a week or for a month. Thereafter, the surface was further coated with a sticking adhesive (Oribine BPS 8170, a product by Toyo Ink Manufacturing Co.) in a coating amount of 50 g/m$^2$ as dried and, after drying of the adhesive at 100° C. for 3 minutes, a slip of lining paper having a width of 5 cm was applied to the surface coated with the adhesive and press-bonded thereto by means of a rubber roller of 2 kg weight moved once back and forth. After standing as such at 25° C. for a day, for a week or for a month, the lining paper was peeled off the substrate surface coated with the organopolysiloxane composition on an automatic recording tensile tester by pulling in a direction of 180° at a pulling velocity of 30 cm/minute to determine the peeling resistance in g/5 cm.

Retention of adhesiveness

A commercially available kraft tape was applied to a silicone-treated paper having been coated with the organopolysiloxane composition and subjected to curing of the composition and press-bonded by keeping under a load of 20 g/cm$^2$ at 70° C. for 20 hours. As a reference, the same kraft tape was applied and press-bonded to a Teflon plate under the same conditions as above. The adhesive bonding strength of the sample after the press-bonding treatment was compared with that after press-bonding to the Teflon plate.

Transfer of silicone

A polyethylene terephthalate film having a thickness of 0.025 mm was applied to a silicone-treated paper prepared by coating a substrate paper with the orgnaopolysiloxane composition followed by curing and press-bonded thereto by keeping for 20 hours at 70° C. under a load of 20 g/cm$^2$. The polyethylene terephthalate film was peeled off the silicone-treated paper and lines were drawn on both surfaces of the film with a red felt pen and the conditions of the drawn lines were compared with each other in respect of repellency of the ink between the surfaces which had been in contact or not in contact with the silicone-treated surface. When difference was noted between them, the result was recorded that the silicone had been transferred to the polyethylene terephthalate film.

Preparation 1

Into a three-necked flask equipped with a stirrer, a thermometer and a dropping funnel were introduced 518 g of water, 1120 g of a 35% hydrochloric acid and 518 g of isopropyl alcohol and the mixture was cooled to 5° C. by dipping the flask in an ice water bath. Then, a mixture composed of 492.1 g of 1,1,3,3-tetramethyl disiloxane and 822.5 g of a partial hydrolyzate of methyl trimethoxy silane containing 40% by weight of the methoxy groups was added dropwise into the mixture in the flask over a period of about 10 minutes through the dropping funnel so that the temperature of the mixture in the flask increased from 5° C. to 20° C. Thereafter, 1120 g of toluene were added to the mixture in the flask which was agitated for 5 hours at 20° C. or below to complete the reaction. The reaction mixture was subjected to phase separation to discard the lower layer of the aqueous solution and the organic solution was washed repeatedly to neutrality and freed from toluene and low boiling matters by distilling under reduced pressure finally to reach 80° C. under a pressure of 30 Torr. The thus obtained product was a methyl hydrogen polysiloxane having a viscosity of 8.2 centistokes and evolving 170 ml/g of hydrogen gas at N.T.P. by the alkali decomposition. This methyl hydrogen polysiloxane is referred to as the H-siloxane 1 hereinbelow.

Preparation 2

The same procedure as in Preparation 1 described above was repeated except that the amount of the 1,1,3,3-tetramethyl disiloxane was decreased to 309.4 g. The methyl hydrogen polysiloxane as the product, which is referred to as the H-siloxane 2 hereinbelow, had a viscosity of 23 centistokes and evolved 130 ml/g of hydrogen gas at N.T.P. by the alkali decomposition corresponding to a value of the ratio n/m of the subscripts in the formula (I) equal to 0.67.

EXAMPLES 1 TO 5 AND COMPARATIVE EXAMPLES 1 TO 3.

The compositions No. 1 to No. 5 in Examples 1 to 5, respectively, and No. 6 to No. 8 in Comparative Examples 1 to 3, respectively, were each prepared by admixing a mixture prepared by dissolving a methyl hydrogen polysiloxane specified below and an acetylenic organosilicon compound of the formula $Me_3Si-O-C-Me_2-C\equiv CH$ as a stabilizing agent in 680 g of toluene together with a vinyl-containing dimethyl polysiloxane specified below.

Vinyl-containing dimethyl polysiloxane
- M-siloxane I: content of vinyl groups 0.75% by moles based on the overall amount of the organic groups, viscosity of 30% toluene solution 15,000 centipoise
- M-siloxane II: content of vinyl groups 1.5% by moles based on the overall amount of the organic groups, viscosity of 30% toluene solution 5,000 centipoise
- M-siloxane III: content of vinyl groups 1.0% by moles based on the overall amount of the organic groups, viscosity of 30% toluene solution 30,000 centipoise Methyl hydrogen polysiloxane
- H-siloxane 1: product in Preparation 1 above
- H-siloxane 2: product in Preparation 2 above
- H-siloxane 3: a methyl hydrogen polysiloxane expressed by the formula $$Me_3Si-O-SiHMe-O)_{40}SiMe_3$$

The amounts of the above mentioned components in g in each of the compositions No. 1 to No. 8 are indicated in Table 1 below.

TABLE 1

| Composition No. | M-siloxane, parts | | | H-siloxane, parts | | | →SiH/ →SiVi molar ratio | Stabilizer, parts |
|---|---|---|---|---|---|---|---|---|
| | I | II | III | 1 | 2 | 3 | | |
| 1 | 300 | — | — | — | 10.3 | — | 1.0 | 10 |
| 2 | 300 | — | — | 7.11 | — | 1.56 | 1.2 | 10 |
| 3 | 300 | — | — | — | 9.65 | 1.80 | 1.4 | 10 |
| 4 | 300 | — | — | 4.74 | — | 2.31 | 1.2 | 10 |
| 5 | — | 100 | 200 | — | 9.82 | 3.66 | 1.2 | 15 |
| 6 | 300 | — | — | — | — | 3.85 | 1.0 | 10 |
| 7 | 300 | — | — | — | — | 5.78 | 1.5 | 10 |
| 8 | — | 100 | 200 | — | — | 7.32 | 1.2 | 15 |

Each a 100 parts portion of the compositions No. 1 through No. 4, No. 6 and No. 7 was admixed with 1 part of a complex of chloroplatinic acid and a vinylsiloxane containing 5% by weight of platinum followed by six times dilution with toluene to give a coating solution, with which a polyethylene-laminated paper was coated in a coating amount of 0.8 g/m² as dried using an offset coater followed by curing of the organopolysiloxane composition by heating for 20 second in a hot-air oven at 150° C. Separately, each a 100 parts portion of the composition No. 5 and No. 8 was admixed with 4.0 parts of the same complex of chloroplatinic acid and a vinylsiloxane as used above followed by two times dilutin with toluene to give a coating solution, with which a polyethylene-laminated paper was coated in a coating amount of 0.5 g/m² as dried using an offset coater followed by drying at 80° C. for 3 seconds in a hot-air oven and then by irradiation with ultraviolet light from an ultraviolet lamp of 160 watts/cm output at a distance of 5 cm above the coated paper which was moved at a velocity indicated in Table 3 to cure the organopolysiloxane composition. Each of the thus prepared silicone-coated polyethylene-laminated papers was subjected to the tests of the peeling resistance, retention of adhesiveness and transfer of silicone according to the procedures described above to give the results shown in Tables 2 and 3.

TABLE 2

| | Days from coating to bonding | Days from bonding to peeling | Composition No. | | | | | |
|---|---|---|---|---|---|---|---|---|
| | | | 1 | 2 | 3 | 4 | 6 | 7 |
| Peeling resistance, g/5 cm | 0 | 1 | 13 | 18 | 25 | 28 | 20 | 60 |
| | 0 | 7 | 14 | 19 | 29 | 30 | 48 | 75 |
| | 0 | 30 | 16 | 23 | 35 | 33 | 65 | 100 |
| | 7 | 1 | 11 | 16 | 23 | 25 | 18 | 38 |
| | 30 | 1 | 10 | 15 | 20 | 22 | 14 | 25 |
| Retention of adhesiveness, % | | | 100 | 100 | 100 | 100 | 90 | 100 |
| Transfer of silicone | | | No | No | No | No | Yes | No |

TABLE 3

| | Composition No. | | | | | |
|---|---|---|---|---|---|---|
| | 5 | | | 8 | | |
| Velocity under lamp, m/minute | 50 | 70 | 100 | 30 | 50 | 70 |
| Curability | Good | Good | Good | Good | Good | Poor |

TABLE 3-continued

| | Composition No. | | | | | |
|---|---|---|---|---|---|---|
| | | 5 | | | 8 | |
| Peeling resistance, g/5 cm | 60 | 65 | 70 | 90 | 100 | — |
| Retention of adhesiveness, % | 100 | 100 | 100 | 100 | 98 | — |
| Transfer of silicone | No | No | No | Slight | Yes | — |

EXAMPLE 6 AND COMPARATIVE EXAMPLE 4

An organopolysiloxane composition, referred to as the composiiton No. 9 hereinbelow, was prepared by admixing a mixture composed of 680 g of toluene, 6.03 g of the H-siloxane 2 prepared in Preparation 2, 2.25 g of the H-siloxane 3 and 3.0 g of the same acetylenic stabilizer as used in Example 1 with 100 g of a vinyl-containing dimethylpolysiloxane containing 2.7% by moles of the vinyl groups based on the overall organic groups, of which a 30% toluene solution had a viscosity of 1,000 centipoise, referred to as the M-siloxane IV hereinbelow, under agitation.

For comparison, another organopolysiloxane composition, referred to as the composition No. 10 hereinbelow, was prepared in the same formulation as for the composition No. 9 except that the combination of 6.03 g of the H-siloxane 2 and 2.25 g of the H-siloxane 3 was replaced with 4.49 g of the H-siloxane 3 alone. The molar ratio of the silicon-bonded hydrogen atoms to the silicon-bonded vinyl groups was 1.0 in each of the compositions No. 9 and No. 10.

Each a 100 parts portion of the compositions No. 9 and No. 10 was admixed with 3.0 parts of the same complex of chloroplatinic acid and a vinylsiloxane as used in Example 1 to give a coating solution, with which a polyethylene-laminated paper was coated in a coating amount of 1.0 g/m² as dried using an offset coater followed by heating for 10 seconds in a hot-air oven at 120° C. to cure the organopolysiloxane composition.

The values of peeling resistance of the thus prepared coated papers using the compositions No. 9 and No. 10 were 120 and 230 g/5 cm, respectively, as measured immediately after preparation and 100 and 140 g/5 cm, respectively, as measured after 1 month standing from preparation. No transfer of silicone was noted from the paper coated with the composition No. 9 while transfer of silicone was clearly noted from the paper coated with the composition No. 10.

What is claimed is:

1. A method for imparting releasability to the surface of a plastic film or paper as the substrate which comprises the steps of:
(a) coating the substrate surface with an organopolysiloxane composition comprising
(1) an organopolysiloxane having, in a molecule, at least two aliphatically unsaturated hydrocarbon groups bonded to the silicon atoms,
(2) an organohydrogenpolysiloxane represented by the general unit formula $(RSiO_{1.5})_m(R_2HSiO_{0.5})_n$, in which each R is, independently from the others, a substituted or unsubstituted monovalent hydrocarbon group free fom aliphatic unsaturation and the subscripts m and n are each a positive integer with the proviso that the ratio of n/m is larger than 0.2 but smaller than 1.5, in such an amount that from 0.5 to 5 moles of the hydrogen atoms directly bonded to the silicon atoms are provided per mole of the aliphatically unsaturated hydrocarbon groups in the organopolysiloxane as the component (1), and
(3) a catalytic amount of a platinum compound; and
(b) subjecting the plastic film or paper coated with the organopolysiloxane composition to a heat treatment or to irradiation with ultraviolet light.

2. A method for imparting releasability to the surface of a plastic film or paper as the substrate which comprises the steps of:
(a) coating the substrate surface with an organopolysiloxane composition comprising
(1) an organopolysiloxane having, in a molecule, at least two aliphatically unsaturated hydrocarbon groups bonded to the silicon atoms,
(2) a combination of organohydrogenpolysiloxane in such an amount that from 0.5 to 5 moles of the hydrogen atoms directly bonded to the silicon atoms are provided per mole of the aliphatically unsaturated hydrocarbon groups in the organopolysiloxane as the component (1), composed of
(2a) a first organohydrogenpolysiloxane represented by the general unit formula $(RSiO_{1.5})_m(R_2HSiO_{0.5})_n$, in which each R is, independently from the others, a substituted or unsubstituted monovalent hydrocarbon group free from aliphatic unsaturation and the subscripts m and n are each a positive integer with the proviso that the ratio of n/m is larger than 0.1 but smaller than 3.0, and
(2b) a second organohydrogenpolysiloxane represented by the general formula $R^1-SiR_2-O-SiHR-O)_p(SiR_2-O)_qSiR_2-R^1$, in which R has the same meaning as defined above, $R^1$ has the same meaning as R or is a hydrogen atom, the subscript p is a positive integer not exceeding 1,000 and the subscript q is zero or a positive integer not exceeding 1,000, in such a proportion that the molar ratio of the silicon-bonded hydrogen atoms provided by the second organohydrogenpolysiloxane to the silicon-bonded hydrogen atoms provided by the first and the second organohydrogenpolysiloxanes is in the range fro 9:10 to 1:10, and
(3) a catalytic amount of a platinum compound; and
(b) subjecting the plastic film or paper coated with the organopolysiloxane composition to a heat treatment or to irradiation with ultraviolet light.

3. The method as claimed in claim 1 wherein the aliphatically unsaturated hydrocarbon group of the component (1) is a vinyl group.

4. The method as claimed in claim 1 wherein the organopolysiloxane as the component (1) is a diorganopolysiloxane having a linear molecular structure and terminated at both molecular chain ends each with a dimethyl vinyl silyl group.

5. The method as claimed in claim 1 wherein the organopolysiloxane as the component (1) has from 0.2 to 5.0% by moles of the aliphatically unsaturated hydrocarbon groups based on the overall amount of the organic groups bonded to the silicon atoms.

6. The method as claimed in claim 1 wherein the group denoted by R in the organohydrogenpolysiloxane as the component (2) is a methyl group.

7. The method as claimed in claim 2 wherein the aliphatically unsaturated hydrocarbon group of component (1) is a vinyl group.

8. The method as claimed in claim 2 wherein the organopolysiloxane as component (1) is a diorganopolysiloxane having a linear molecular structure and terminated at both molecular chain ends each with a dimethyl vinyl silyl group.

9. The method a claimed in claim 2 wherein the organopolysiloxane as component (1) has from 0.2 to 5.0% by moles of the aliphatically unsaturated hydrocarbon groups based on the overall amount of the organic groups bonded to the silicon atoms.

10. The method as claimed in claim 2 wherein the group denoted by R in the organohydrogenpolysiloxane as component (2) is a methyl group.

* * * * *